W. F. SCHACHT.
RUBBER ELASTIC FORCE CUP.
APPLICATION FILED SEPT. 25, 1908.

930,236.

Patented Aug. 3, 1909.

Witnesses

William F. Schacht, Inventor

By C. A. Snow & Co.
Attorneys

UNITED STATES PATENT OFFICE.

WILLIAM F. SCHACHT, OF GOSHEN, INDIANA.

RUBBER ELASTIC FORCE-CUP.

No. 930,236.  Specification of Letters Patent.  Patented Aug. 3, 1909.

Application filed September 25, 1908. Serial No. 454,778.

*To all whom it may concern:*

Be it known that I, WILLIAM F. SCHACHT, a citizen of the United States, residing at Goshen, in the county of Elkhart and State of Indiana, have invented a new and useful Rubber Elastic Force - Cup, of which the following is a specification.

This invention relates to force cups and has as its primary object to provide, in a single structure, a device of this class which may be used as a force cup or as a suction cup.

A further object of the invention is to provide, in a device of this class, a means for holding the handle in the handle socket of the device, the handle and its socket being so constructed that the handle may be readily removed and reinserted and securely held in place without the necessity of cementing it or attaching it by means of washers and a screw as is at present the means most commonly employed.

Figure 1:
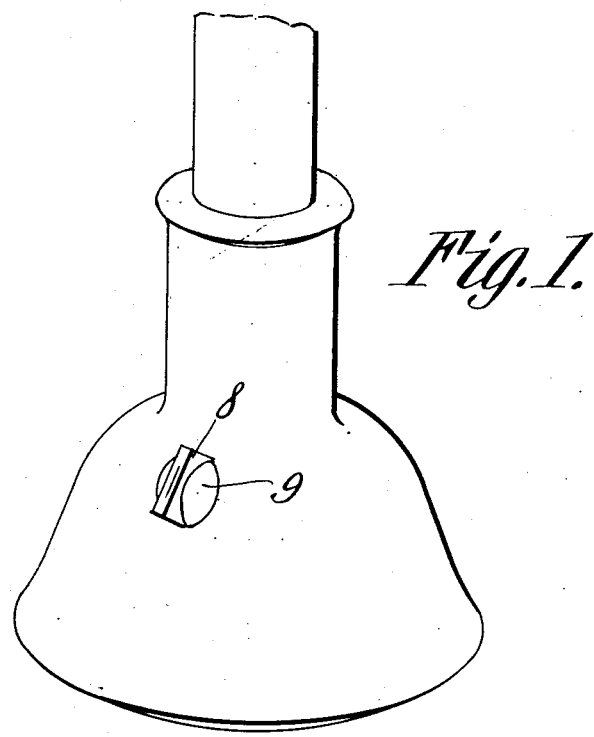
Figure 2:
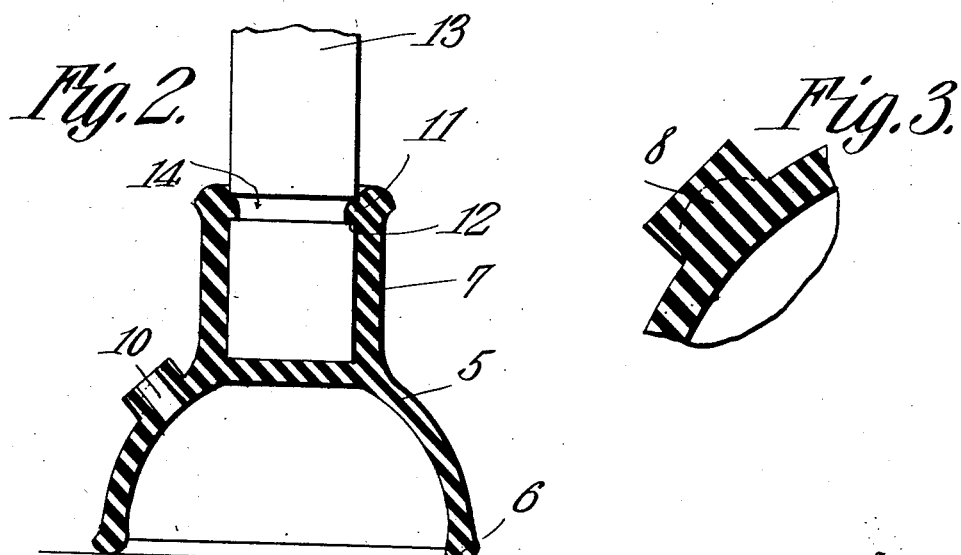
Figure 3:
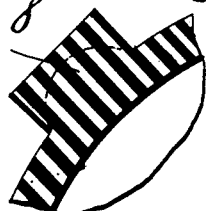

In the accompanying drawings, Figure 1 is a perspective view of the cup embodying my invention, Fig. 2 is a vertical sectional view therethrough taken in a plane with the valve, and Fig. 3 is a detail view similar to Fig. 2 but before the cup has been punctured.

As shown in the drawings, the cup embodying my invention is comprised of a cup shaped body 5 provided at its edge with a bead 6 and axially with a handle socket 7, the entire cup being formed integral and of rubber. The cup 5 is also formed at one side with a tongue 8 which extends outwardly from the said cup and is reinforced at its point of junction with the wall of the cup as clearly shown in Fig. 1 of the drawings, and as indicated by the numeral 9.

It is my intention that the cup above described shall be placed upon the market with the tongue 8 in the condition shown in Fig. 3 of the drawings, the cup when used in this condition, being designed to act as a force cup. If it is preferred that the cup should act as a suction cup, after it has been purchased, it is only necessary for the purchaser to form a slit in the tongue 8 lengthwise thereof as indicated by the numeral 10 in Figs. 1 and 2 of the drawings, this being done with an ordinary penknife or a like implement. After this slit 10 has been formed in the wall of the cup, the effect of a valve is obtained as the slit will open when pressure is exerted in a downward direction upon the cup and will close as soon as this pressure is relieved, the opening of the slit allowing the escape of the air from beneath the cup and its closing and subsequent expansion of the cup to normal position creating a partial vacuum and causing a suction through the drain pipe or the like over the end of which the cup has been placed. It will be understood that by forming the slit 10 through the extension which is formed integral with the cup wall and which is reinforced, a quick closing and thoroughly airtight valve is produced.

Formed interiorly of the handle socket 7 at the upper end thereof is an annular rib 11 having an abrupt shoulder 12 presented in the direction of the bottom end of the socket. The handle for the cup is indicated by the numeral 13 and is of such diameter as to fit snugly in the socket 7 and is formed adjacent its lower end with an annular groove 14 in which the rib 11 is designed to seat when the handle is inserted into the socket, the said groove having one of its walls substantially at right angles to the axis of the handle to engage the abrupt shoulder 12 of the rib 11, it being understood that the handle is, by this construction, more securely held in place in the socket and that any additional securing such as cement or a screw or the like is entirely unnecessary.

One of the advantages of the handle and handle socket construction above described lies in the fact that the handle may be packed separately from the cup when the devices are being shipped in large quantities whereas in the ordinary construction of such devices, the handles are not readily detachable and it is not only difficult to pack the devices in a small space but they are liable to injury during shipment.

What is claimed is:—

1. A device of the class described comprising an elastic cup shaped member provided with a portion upon its outer wall adapted to be punctured.

2. A device of the class described comprising an elastic cup shaped member provided with a thickened portion upon its outer wall adapted to be punctured.

3. A device of the class described comprising an elastic cup shaped member formed upon its outer wall with an outwardly extending protuberance adapted to be punctured.

4. A device of the class described comprising an elastic cup shaped member having upon its outer wall a reinforced portion adapted to be punctured.

5. A device of the class described comprising an elastic cup shaped member formed with a handle socket provided interiorly with an annular rib having a convexed upper face and an abruptly shouldered under face, and a handle fitted into the socket and formed with a circumscribing groove having a concaved wall and an abrupt wall affording a shoulder engaging the abruptly shouldered under face of the rib of the socket.

6. A device of the class described comprising an elastic cup shaped member formed with a handle socket provided interiorly with an annular rib having an abrupt shoulder, and a handle fitted into the socket and formed with a groove adapted to receive the rib and having one of its walls of abrupt formation to engage with the shoulder of the rib.

In testimony that I claim the foregoing as my own, I have hereto affixed my signature in the presence of two witnesses.

WILLIAM F. SCHACHT.

Witnesses:
MYRON J. RHOADS,
C. E. LOVEJOY.